(12) United States Patent
Sayed et al.

(10) Patent No.: US 8,352,457 B2
(45) Date of Patent: Jan. 8, 2013

(54) DYNAMICALLY GENERATING AN XQUERY

(75) Inventors: Zainab Gaziuddin Sayed, Pune (IN); Arjun Banerjee, Kolkata (IN)

(73) Assignee: Software AG, Darmstadt (DE)

( * ) Notice: Subject to any disclaimer, the term of this patent is extended or adjusted under 35 U.S.C. 154(b) by 787 days.

(21) Appl. No.: 12/035,100

(22) Filed: Feb. 21, 2008

(65) Prior Publication Data

US 2009/0106186 A1 Apr. 23, 2009

(30) Foreign Application Priority Data

Oct. 22, 2007 (IN) ............................ 1435/KOL/2007

(51) Int. Cl.
*G06F 17/30* (2006.01)
(52) U.S. Cl. ........................................................ 707/713
(58) Field of Classification Search .................. 707/759, 707/705, 758, 713
See application file for complete search history.

(56) References Cited

U.S. PATENT DOCUMENTS

| | | | |
|---|---|---|---|
| 2006/0101002 A1 | 5/2006 | Peterson et al. | |
| 2007/0150473 A1* | 6/2007 | Li et al. ............................. | 707/7 |
| 2008/0097974 A1* | 4/2008 | Chen et al. ........................ | 707/4 |
| 2008/0222101 A1* | 9/2008 | Beyer et al. ....................... | 707/3 |
| 2008/0294666 A1* | 11/2008 | Gesmann ..................... | 707/101 |

OTHER PUBLICATIONS

Fitzgerald, John, "Tamino Technical Overview" Apr. 20, 2006, www.xml.gov <http://xml.gov/presentations/softwareag3/tamino.ppt>, p. 1-21.*
Stylus Studio, "Blooming FLWOR—An Introduction to the XQuery FLWOR Expression" Oct. 21, 2006, www.archive.org <http://web.archive.org/web/20061021180152/http://www.stylusstudio.com/xquery_flwor.html>, p. 1-10.*
SoftwareAG, "Tamino Benefits" Sep. 19, 2006, www.archive.org, p. 1.*
SoftwareAG, "Tamino Benfits" Sep. 19, 2006, www.archive.org, p. 1.*
Abraham, Robin; "FoXQ—XQuery by Forms"; Proceedings of the 2003 IEEE Symposium on Human Centric Computing Languages and Environments; Oct. 28-31, 2003; pp. 289-290.
Jayapaudian, et al.; "Automating the Design and Construction of Query Forms"; Proceedings of the 22nd International Conference on Data Engineering; 2006; Atlanta, GA; Apr. 3-7, 2006; IEEE; 8 pages.
Petropoulos, et al.; "Graphical Query Interfaces for Semistructured Data: The QURSED System"; ACM Transactions on Internet Technology; vol. 5, No. 2; May 2005; pp. 390-438.
European Search Report for application No. EP 08003018, search completed Apr. 23, 2008.

* cited by examiner

*Primary Examiner* — Etienne Leroux
(74) *Attorney, Agent, or Firm* — Meyertons Hood Kivlin Kowert & Goetzel, P.C.; Jeffrey C. Hood; Joel L. Stevens

(57) ABSTRACT

Dynamically generating an XQuery for an XML database storing a plurality of non-XML documents, each non-XML document having a corresponding shadow XML document in the XML database. The method may include providing a plurality of static units of XQuery code, the static units being predefined in accordance with the non-XML documents. The method may further include combining the one or more static units with dynamic input from a user to generate the XQuery.

16 Claims, 1 Drawing Sheet

Figures 1, 2:
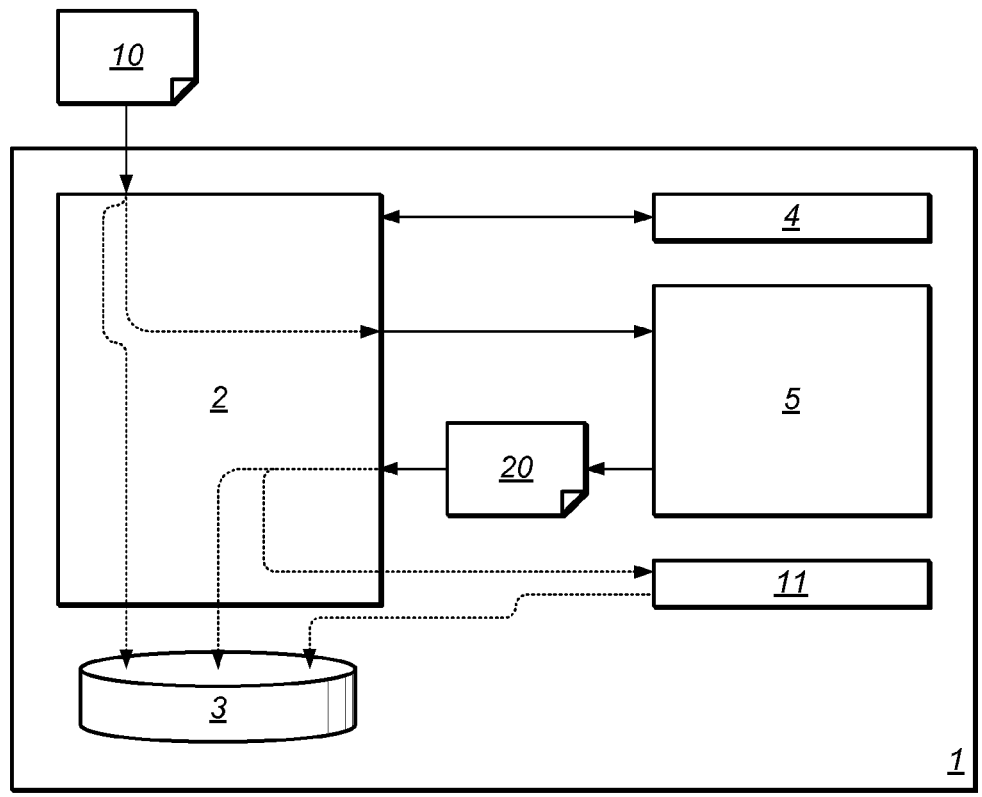

```
30 — for $i in input()/wordDocument

31 — let $CreationDate :=$i/properties/meta/office:document-meta/office:meta/
        meta:creation-date 32 — where tf:containsText($iproperties/content, "Java Script")

33 ⎰ return
     ⎱   <docname>tf:getDocname(root($i))} </docname>
         </return>
```

30 ── for $i in input()/wordDocument

31 ── let $CreationDate :=$i/properties/meta/office:document-meta/office:meta/
meta:creation-date 32 ── where tf:containsText($iproperties/content, "Java Script")

33 ⎰ return
   ⎨   <docname>tf:getDocname(root($i))}   </docname>
   ⎱ </return>

DYNAMICALLY GENERATING AN XQUERY

PRIORITY CLAIM

This application claims benefit of priority of Indian application no. 1435/KOL/2007 titled "Method and XQuery Builder for Dynamically Generating an XQuery", filed Oct. 22, 2007, and whose inventors are Zainab Gaziuddin Sayed and Arjun Banerjee.

INCORPORATED BY REFERENCE

Indian application no. 1435/KOL/2007 titled "Method and XQuery Builder for Dynamically Generating an XQuery", filed Oct. 22, 2007, and whose inventors are Zainab Gaziuddin Sayed and Arjun Banerjee, is hereby incorporated by reference in its entirety as though fully and completely set forth herein.

TECHNICAL FIELD

The present invention relates to a method for dynamically generating an XQuery for an XML database storing a plurality of non-XML documents.

DESCRIPTION OF THE RELATED ART

XML databases are one of the most important technical tools of modern information societies. The high degree of flexibility of such a database allows for storage to and retrieval of data in a highly efficient manner. Generally, XML databases are designed for XML documents. However, in the prior art, it is also known to extend an XML database so that it is capable of storing other types of documents. For example, the XML database Tamino of the current Assignee is adapted to store non-XML documents such as plain text files, MS Office files, PDF files, images and audio files, etc. To enable the future retrieval of such non-XML documents from the database, it is known to analyze any non-XML document to be stored and to extract metadata for generating a so-called XML shadow document corresponding to the non-XML document. Using XQuery, such shadow XML documents can later be searched and the corresponding non-XML document can be retrieved.

Since XQuery only has limited Text Retrieval (TR) functionality in its original form, it can be extended with additional TR indexes and dedicated TR query engines. For example, the XQuery version in applicant's Tamino XML database is delivered with a package of common TR functions, such as, for example, "contains", "near", or "adjacent".

XQuery Builders are tool applications for databases that are typically contained in data administration and inspection packages. XQuery Builders enhance users' productivity by shielding them from the sometimes complicated syntax and semantics of the query language. Instead, the user is provided with a GUI-supported access to a restricted functionality of the query language, enabling him to do a considerable part of his routine work without knowledge of the syntax and semantics of the query language. An example of such an XQuery builder of the prior art is disclosed in U.S. Publication No. 2006/0101002.

However, when searching through a large amount of unknown and un-categorized data, in particular text data, XQuery Builders of the prior art are not suitable, since they still require a high level of skill of the user. Accordingly, improvements in XQuery Builders are desired.

SUMMARY OF THE INVENTION

Various embodiments are presented of a method for dynamically generating an XQuery for an XML database storing a plurality of non-XML documents. Each non-XML document may have a corresponding shadow XML document in the XML database. The method may include providing a plurality of static units of XQuery code, the static units being predefined in accordance with the non-XML documents. The method may further include combining the one or more static units in response to dynamic input from a user to generate the XQuery, and storing the resulting XQuery.

As a result, the user can easily generate an XQuery, which may be specifically adapted or usable to retrieve a certain set of non-XML documents (and their corresponding shadow XML documents) by flexibly combining the specifically adapted predefined static XQuery code units. For example, if the non-XML documents are text documents, the predefined code units may contain TR functions, which can then easily be combined or adjusted by a user as required.

For implementing the described method, a "data architect" could at first predefine the static code units and then let the user combine the units and, if desired, even add some free-form part for the resulting query. Such a data architect could therefore serve as a mediator between inexperienced users and the data to be retrieved by the XQuery, similar to how a librarian facilitates access to the books of a library. The dynamic input from the user may be obtained by presenting a GUI to the user, the GUI providing one or more buttons relating to the one or more static units.

In one embodiment, providing the plurality of static units of XQuery Code may include providing a FLWOR (For, Let, Where, Order by, Return) expression comprising a static for clause predefined in accordance with the non-XML documents. The for clause may indicate the doctype and the collection which contains the documents on which the query is to be executed. The XQuery may be executed on the shadow XML documents.

The FLWOR expression may further include a static return clause predefined in accordance with the non-XML documents. The static return clause may contain the relevant information about the result set, e.g., the corresponding ino:id(s), ino:docname(s), etc. In addition, the FLWOR expression may include a static let clause for declaration of a variable, for example a creation date of the non-XML documents. Finally, the FLWOR expression may comprise a where clause including at least one dynamically defined user criterion for the XQuery. The where clause may not be restricted to a single criterion but may comprises a plurality of user criteria combined by Boolean operators.

In one embodiment, the non-XML documents may be text documents, in particular Microsoft Office documents and/or Adobe PDF documents. Each text document may comprise predefined text parts and free-form text.

According to another aspect, the method described above may be implemented as program instructions stored in a memory medium (e.g., executable as an XQuery Builder). Finally, a computer program is provided comprising instructions adapted to perform any of the described methods.

SHORT DESCRIPTION OF THE DRAWINGS

In the following detailed description presently preferred embodiments of the invention are further described with reference to the following figures:

FIG. 1: A schematic representation of an XML database, according to one embodiment; and FIG. 2: A schematic representation of a generated XQuery, according to one embodiment.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

In the following, exemplary embodiments are presented of a method for dynamically generating an XQuery for an XML database storing a plurality of non-XML documents. It will be understood that the functionality described below can be implemented in a number of alternative ways, for example on a single database server, in a distributed arrangement of a plurality of database servers, with an integral storage or an external storage, etc. None of these implementation details is essential for the present invention and other embodiments are envisioned.

FIG. 1

FIG. 1 presents an overview of an exemplary XML database system 1. The system 1 generally serves to store and to retrieve XML documents (not shown) in FIG. 1. However, the XML database system of FIG. 1 may also be capable to process non-XML documents such as the exemplary file 10 shown in FIG. 1. The file 10 can be any type of non-XML document, e.g. a text file in any kind of format (WORD, PDF), a video file, an audio file, a combination thereof, an image, an arbitrary set of binary data such as measurement results, etc.

For processing the file 10, the XML database system 1 may include, in one embodiment, a document processor 2. The document processor 2 may drive the process for storing a document. As illustrated by the dotted arrow on the left side of FIG. 1, the file 10 may be stored in the storage means 3, for example a RAID array (not shown) or a similar storage device of the XML data base system 1. Any volatile or non-volatile storage means known to the person skilled in the art can be used as the storage means 3 of the XML database system 1.

In addition, the file 10 may be forwarded to a schema processor 4. The operation of the schema processor 4 and the further elements of the XML database system 1 which are shown on the right side of FIG. 1 may serve to process the file 10 so that it can be searched and retrieved similar to other XML documents stored in the database. In the exemplary embodiment of FIG. 1, the schema processor 4 may provide info about a server extension 5 to be called. It is to be noted that the server extension 5 could also be integrated into the standard processing engine of a database sever of the overall XML database system and does not have to be provided as a separate entity. However, the provision of a separate server extension 5 may facilitate the upgrading of an existing XML database system with the functionality for the handling of non-XML files, such as the file 10.

The server extension 5 may process the file 10 and generate content for a shadow XML document 20. Depending on the type of file 10, different steps can be performed to generate the shadow XML document 20. For example, image processing on an image file 10 may be performed leading to an output of metadata about the image such as its resolution, color distribution or any other type of image related information. Other types of non-XML files may be processed similarly to generate any kind of metadata for the shadow XML document 20. Using the shadow XML document 20, a search can be performed, which allows to quickly retrieve the corresponding non-XML file 10 from the database, e.g., via query processor 11.

One embodiment of the above explained XML database system is available from applicant under the name Tamino. The server extension of the Tamino database system of applicant is called Tamino Non-XML Indexer. It integrates non-XML files, for example Microsoft Office documents or Adobe PDF documents, into the Tamino database system. When a non-XML file is stored or updated in a Tamino database collection in which the Tamino Non-XML Indexer is active, Tamino stores two objects, namely the non-XML file itself and its shadow file comprising the raw data contained in the file, for example the plain ASCII text in a Microsoft Word file and the metadata extracted from the file.

An XQuery for retrieving a shadow XML document and the corresponding non-XML document may typically contain a FLOWR expression. In fact, FLWOR expressions are typically at the heart of XQuery, because they allow a logically structuring of the query. A FLWOR expression may contain clauses that are introduced by the keywords for, let, where and return. A FLOWR expression may begin with at least one of the clauses for and let, which may be followed by a where clause and end with the return clause. An example for a generated XQuery comprising the four clauses is shown in FIG. 2.

Generating such an XQuery is made substantially easier for a user who is not familiar with the syntax and the semantics of the language if clauses of the FLWOR expression, which are with a high degree of likelihood repeatedly used for different XQueries, are static, i.e., pre-defined. In the example of FIG. 1, the for clause 30 may be static and may indicate the collection and doctype which contains the documents on which the query is to be executed. The clause 30 may depend on a given set of non-XML documents and may be the same for many different XQueries to be performed on this set. The let clause 31 may also be used in a static way; it may be used for variable declaration, e.g., CreationDate.

The where clause 32 may be used to dynamically aggregate XQuery fragments corresponding to different user-defined criteria. The XQuery fragments may be dynamically created in response to user input or also predefined and only selected by user. There may be more than one where clause 32 in an XQuery (not shown in FIG. 2). Further, one or more conditions can be combined within a where clause using Boolean operators, thereby providing a high amount of flexibility for the user. Using the where clause 32, conditions can be defined that the previously generated tuples satisfy. If the condition is met, the tuple may be retained and if not, the tuple may be discarded.

The static return clause 33 may contain the relevant information about the result set, e.g., the corresponding ino:id(s), ino:docname(s), etc. It may be used to determine the result of the whole FLOWR expression. It may be invoked for every tuple that is retained after evaluating the where clause 32. The return value can be formatted. Again, for many XQueries on a given set of data, the return clause 33 may be identical so that this clause can also be static.

A preferred field of use for the described mechanism relates to documents with a considerable amount of text stored in Tamino (or a similar XML database system). Here, the mechanism may facilitate full use of Tamino's Text Retrieval abilities in combination with the "normal" XQuery features.

The mechanism may, for example, be used for documents that combine free-form text with predefined fixed-form fields, or with predefined standard text inside the free-form text. An important example is a search in Curriculum Vitae (CV) documents by a Human Resources department of a company. A CV is typically a MS Word or a PDF document describing education, skills, and career in terms of previous projects. Another relevant example is a search in patient data records within any kind of healthcare system. In both situations, there are likely tens of thousand of semi-structured text documents to be managed.

For implementing the described method in an embodiment of an XQueryBuilder, a "data architect" could initially prepare a set of fixed-form XQueries which are most suitable for the respective set of non-XML documents and which are then made accessible to a user. For example, a graphical user interface (GUI) can be provided having corresponding selection buttons. In addition to selecting one of the fixed-form XQueries, the user can generate new XQueries with FLOWR expressions as described above, e.g., by combining the selection of the buttons of the GUI and/or by adding some free-form queries.

The user may not have to inspect the non-XML documents in order to generate meaningful XQueries as explained above. If the data architect does have some knowledge of the internal structure of the non-XML, this may be helpful for predefining parts of the FLOWR expression. However, this is not necessary. Generally, embodiments described herein allow for storing all of the non-XML documents "as-is" into the XML database system, e.g. Tamino, and the described mechanism allows for performing searches thereon.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A method for dynamically generating an XQuery for an XML database that stores a plurality of non-XML text documents, each non-XML text document having a corresponding shadow XML document in a collection of shadow XML documents in the XML database, wherein the collection contains the corresponding shadow XML documents on which the XQuery is to be executed, wherein each shadow XML document comprises metadata extracted from the corresponding non-XML text document and wherein the XML database is configured for executing an XQuery on the shadow XML documents and for retrieving corresponding non-XML text documents, the method comprising:
   providing a FLWOR expression comprising a plurality of units of XQuery code, the plurality of units being predefined based on the non-XML text documents and comprising at least one predefined text retrieval function, wherein the FLWOR expression comprises a for clause predefined based on the shadow XML documents in the collection of shadow XML documents corresponding to the non-XML text documents, wherein the for clause indicates the collection of shadow XML documents and a doctype;
   combining the one or more units with dynamic input from a user to generate the XQuery, the dynamic input from the user defining a where clause including at least one dynamically defined condition for the XQuery; and
   storing the XQuery.

2. The method of claim 1, wherein the FLWOR expression further comprises a return clause predefined based on the non-XML text documents.

3. The method of claim 1, wherein the FLWOR expression comprises a where clause including at least one dynamically defined user criterion for the XQuery.

4. The method of claim 3, wherein the where clause comprises a plurality of user criteria combined by logical operators.

5. The method of claim 1, wherein the non-XML text documents comprise one or more of Microsoft Office documents or Adobe PDF documents.

6. The method of claim 5, wherein each non-XML text document comprises free-form text and predefined text parts.

7. The method of claim 1, wherein the method further comprises:
   presenting a GUI to the user, wherein the GUI comprises one or more buttons relating to the plurality of units; and
   receiving the input from the user via the GUI.

8. A non-transitory computer accessible memory medium storing program instructions for dynamically generating an XQuery for an XML database that stores a plurality of non-XML text documents, each non-XML document having a corresponding shadow XML document in a collection of shadow XML documents in the XML database, wherein the collection contains the corresponding shadow XML documents on which the XQuery is to be executed, wherein each shadow XML document comprises metadata extracted from the corresponding non-XML text document and wherein the XML database is configured for executing an XQuery on the shadow XML documents and for retrieving corresponding non-XML text documents, wherein the program instructions are executable to:
   provide a FLWOR expression comprising a plurality of units of XQuery code, the plurality of units being predefined based on the non-XML text documents and comprising at least one predefined text retrieval function, wherein the FLWOR expression comprises a for clause predefined based on the shadow XML documents in the collection of shadow XML documents corresponding to the non-XML text documents, wherein the for clause indicates the collection of shadow XML documents and a doctype; and
   combine the one or more units according to dynamic input from a user to generate the XQuery, the dynamic input from the user defining a where clause including at least one dynamically defined condition for the XQuery.

9. The non-transitory computer accessible memory medium of claim 8, wherein the FLWOR expression further comprises a return clause predefined based on the non-XML text documents.

10. The non-transitory computer accessible memory medium of claim 8, wherein the FLWOR expression comprises a where clause including at least one dynamically defined user criterion for the XQuery.

11. The non-transitory computer accessible memory medium of claim 10, wherein the where clause comprises a plurality of user criteria combined by logical operators.

12. The non-transitory computer accessible memory medium of claim 8, wherein the non-XML text documents comprise one or more of Microsoft Office documents or Adobe PDF documents.

13. The non-transitory computer accessible memory medium of claim 12, wherein each non-XML text document comprises free-form text and predefined text parts.

14. The non-transitory computer accessible memory medium of claim 8, wherein the program instructions are further executable to:

presenting a GUI to the user, wherein the GUI comprises one or more buttons relating to the plurality of units; and receive the input from the user via the GUI.

15. A system, comprising:

a processor;

a display coupled to the processor; and a memory medium storing program instructions for dynamically generating an XQuery for an XML database that stores a plurality of non-XML text documents, each non-XML document having a corresponding shadow XML document in a collection of shadow XML documents in the XML database, wherein the collection contains the corresponding shadow XML documents on which the XQuery is to be executed, wherein each shadow XML document comprises metadata extracted from the corresponding non-XML text document and wherein the XML database is configured for executing an XQuery on the shadow XML documents and for retrieving corresponding non-XML text documents, wherein the program instructions are executable by the processor to:

present a GUI to the user, wherein the GUI comprises one or more buttons relating to providing a FLWOR expression comprising a plurality of units of XQuery code, the plurality of units being predefined based on the shadow XML documents and comprising at least one predefined text retrieval function, wherein the FLWOR expression comprises a for clause predefined based on the collection of shadow XML documents corresponding to the non-XML text documents, wherein the for clause indicates the collection of shadow XML documents and a doctype; and receive user input to the GUI, wherein the user input defines a where clause including at least one dynamically defined condition for the XQuery; and combine the one or more units according to the user input to generate the XQuery.

16. The system of claim 15, wherein the FLWOR expression comprises a where clause including at least one dynamically defined user criterion for the XQuery.

* * * * *

UNITED STATES PATENT AND TRADEMARK OFFICE
CERTIFICATE OF CORRECTION

PATENT NO. : 8,352,457 B2
APPLICATION NO. : 12/035100
DATED : January 8, 2013
INVENTOR(S) : Zainab Gaziuddin Sayed and Arjun Banerjee It is certified that error appears in the above-identified patent and that said Letters Patent is hereby corrected as shown below:

In the Specifications:

In Column 4, Line 21, delete "FLOWR" and insert --FLWOR--.
In Column 4, Line 25, delete "FLOWR" and insert --FLWOR--.
In Column 4, Line 57, delete "FLOWR" and insert --FLWOR--.
In Column 5, Line 19, delete "FLOWR" and insert --FLWOR--.
In Column 5, Line 27, delete "FLOWR" and insert --FLWOR--.

Signed and Sealed this
Twenty-third Day of April, 2013

Teresa Stanek Rea
*Acting Director of the United States Patent and Trademark Office*